United States Patent
Andoh et al.

(10) Patent No.: US 6,795,257 B2
(45) Date of Patent: Sep. 21, 2004

(54) FIXING STRUCTURE FOR PARTS OF OPTICAL ELEMENT, IMAGE DATA INPUT UNIT AND IMAGE DATA INPUT APPARATUS

(75) Inventors: Jun Andoh, Ohta-ku (JP); Yoshihiro Morii, Ohta-ku (JP); Hiroshi Takemoto, Ohta-ku (JP); Nobuaki Ono, Ohta-ku (JP); Toshio Kobayashi, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 22 days.

(21) Appl. No.: 09/888,600

(22) Filed: Jun. 26, 2001

(65) Prior Publication Data

US 2002/0018306 A1 Feb. 14, 2002

(30) Foreign Application Priority Data

Jun. 26, 2000 (JP) ........................................ 2000-190578

(51) Int. Cl.[7] ................................................ G02B 7/02
(52) U.S. Cl. ..................... 359/819; 359/822; 359/823
(58) Field of Search ................................ 359/819, 822, 359/823, 694, 871, 811, 808

(56) References Cited

U.S. PATENT DOCUMENTS

| | | | |
|---|---|---|---|
| 4,493,573 A | | 1/1985 | Hashimoto et al. |
| 4,780,739 A | * | 10/1988 | Kawakami et al. ............ 396/54 |
| 4,795,284 A | | 1/1989 | Yumoto et al. |
| 4,846,595 A | | 7/1989 | Kato et al. |
| 5,210,648 A | * | 5/1993 | Bedzyk ....................... 359/813 |
| 5,257,138 A | * | 10/1993 | Yamaguchi et al. ......... 359/819 |
| 5,358,165 A | | 10/1994 | Andoh |
| 5,526,194 A | * | 6/1996 | Ruffell ........................ 359/827 |
| 5,680,260 A | * | 10/1997 | Farcella et al. ............. 359/819 |
| 5,936,239 A | * | 8/1999 | Tsai et al. .................... 250/239 |
| 6,000,784 A | | 12/1999 | Takemoto et al. |
| 6,127,012 A | | 10/2000 | Nagatsuna et al. |
| 6,217,684 B1 | | 4/2001 | Morii et al. |
| 6,224,709 B1 | | 5/2001 | Takemoto et al. |
| 6,247,817 B1 | * | 6/2001 | Ogawa et al. ................. 353/38 |
| 6,361,177 B2 | * | 3/2002 | Umetsu ....................... 359/871 |
| 6,381,057 B1 | | 4/2002 | Itabashi |
| 6,400,391 B1 | | 6/2002 | Suhara et al. |
| 6,469,772 B1 | | 10/2002 | Itabashi |
| 6,473,553 B1 | * | 10/2002 | Jerman et al. .............. 385/137 |
| 6,492,956 B1 | | 12/2002 | Itabashi |
| 2002/0018296 A1 | * | 2/2002 | Kashiwaba et al. ......... 359/554 |

* cited by examiner

Primary Examiner—Ricky Mack
Assistant Examiner—Brandi Thomas
(74) Attorney, Agent, or Firm—Oblon, Spivak, McClelland, Maier & Neustadt, P.C.

(57) ABSTRACT

Providing a fixing structure for parts of optical element by which fixing of parts of optical element with high accuracy can be achieved after positional adjustment in axes with an arrangement the positional adjustment in axes of parts of optical element is easily achieved before the fixing of the parts of optical element. The fixing structure comprises lens 3 having an edge surface which is a side surface surrounding a light beam passing surface; an intermediate holding member 5 having a first attaching surface 5a which is facing to the side surface and having a second attaching surface 5b which has a different angle from said first attaching surface 5a; and a housing 2 having an attaching surface 2c which is facing to the second attaching surface 5b; the housing 2 and the lens 3 which has been adjusted the positional relation to the housing 2 are adhered and fixed through the intermediate holding member 5.

18 Claims, 10 Drawing Sheets

FIXING STRUCTURE FOR PARTS OF OPTICAL ELEMENT, IMAGE DATA INPUT UNIT AND IMAGE DATA INPUT APPARATUS

FIELD OF THE INVENTION

The present invention relates to a fixing structure for parts of optical element, particularly it relates to a fixing structure for parts of optical element which is utilized in copying machine, facsimile machine, image scanner and so on, in which the solid state image forming device is used to input optical image.

BACKGROUND OF THE INVENTION

Figure 14:
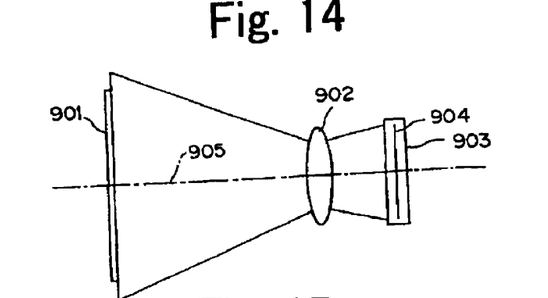
FIG. 14 is a plan view to show a positional relation between the object to be input, the image focusing lens and the solid state image forming device in prior art.

Generally an image data input apparatus in which optical image is input as optical signal using solid state image forming device such as CCD, inputs image of object 901 focused on solid state image forming device 903 through image focusing lens 902 as shown in FIG. 14. In the solid state image forming device 903, one line of solid state image forming device is utilized in which plurality of micro photoelectric transforming devices (hereinafter it is referred to as merely "pixel", which usually has a small dimension of some micrometers square) are arranged in straight line.

Figure 15:
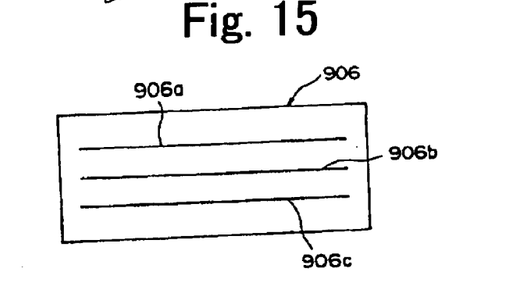
FIG. 15 is a rough sketch of front view of a solid state image forming device in prior art.

Recently, in order to input colored images there is a case in that the solid state image forming device 906 in which pixel R(906a), G(906b) and B(906c) having a peak of spectroscopic sensitivity in Red (hereinafter referred to as merely "R"), Green (hereinafter referred to as merely "G") and Blue (hereinafter referred to as merely "B") respectively, are arranged in three lines respectively, is used as shown in FIG. 15.

Usually accurate positioning adjustment of such solid state image forming device 906 is requested in high precision for every five dimension respectively, and what is seemed to be indispensable to attain the request is a technology by which discrepancy of positioning of solid state image forming device 906 is not happened when the solid state image forming device 906 is fixed onto a flame after the position of solid state image forming device 906 is adjusted as above stated.

The reason such technology is requested is because even the positioning has been adjusted with high precision, when discrepancy is happened at fixing, positioning adjustment must be needed again or separable parts must be scraped when the fixing method includes separable but not adjustable parts.

Up to now the fixing is mainly achieved by screws, however, when such kind of fixing method is utilized, a problem is happened that an amount of discrepancy becomes large such an ranged between some tens micro meters and some hundreds micro meters To solve this kind of inconvenience it may take into consideration that complicated mechanism and parts comprising arrowheads, balls and springs instead of screw are utilized, however, the cost increases much more because the components are expensive.

Accordingly, at present a fixing by adhesive material is mainly tried which is thought that amount of discrepancy is much less than that by screws and that problem regarding to number of parts is much less. There are two methods in the fixing by adhesive material when it is classified roughly, one is a method for the case that objects to be fixed together in contacting each other, and another is a method for the case that objects to be fixed together is not contacting with space.

Herein the former is called as contacting adhering method and the latter is called as causing adhering method.

In the caulking adhering method, there is a space which is larger than that for space adjusting, and the adhesive material is introduced and filled the apace in order to fix. As a prior art technology of this kind of caulking adhering method, it is disclosed, for example, in Japanese Patent Laid Open No. Hei 7-297998. The technology settles the space between the objects to be adhered so that the objects to be adhered would not contact each other even when they have problem of accuracy in shape and size and the adhesive material is filled between the space to fix.

Also as an attaching method onto a head holding member through an ultraviolet setting adhesive material, there is a method as shown in FIG. 16.

Figure 16A:
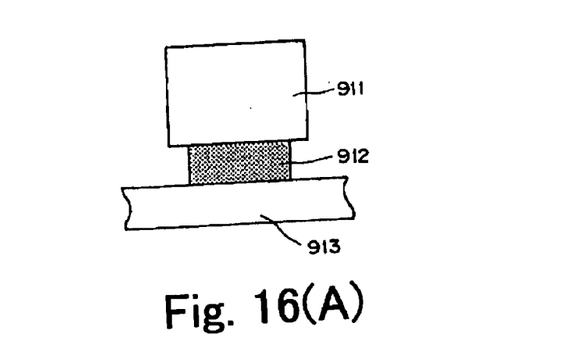
FIG. 16 are plan views to show an attaching process of a work piece in prior art.
Figure 16B:
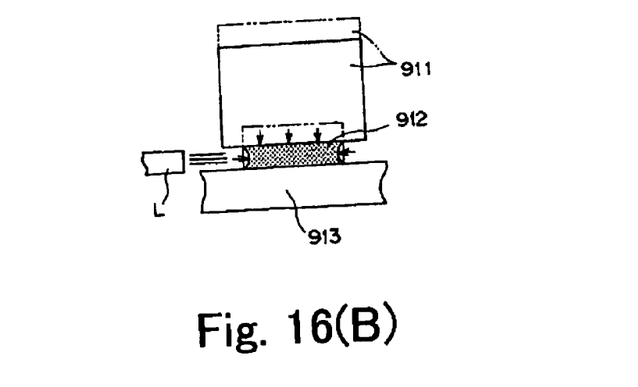

In the method shown in FIG. 16, adhesive material 912 is painted on one surface of a work piece 911 and the work piece 911 is adjusted for its positional relation to a work piece holding member 913 as shown in FIG. 16(A). When the work piece 911 is fixed onto the work piece holding member 913 through the adhesive material 912, by irradiating ultraviolet to the adhesive material 912 through a light guide L from a space between the work piece 911 and the work piece holding member 913, the adhesive material 912 is hardened to fix the work piece 911 onto the work piece holding member 913 as shown in FIG. 16(B). Herein, when either one of the work piece 911 or the work piece holding member 913 is made of a ultraviolet transparent material, the ultraviolet may be passed through the transparent material to irradiate the adhesive material 912.

However, in the prior art technique such as described above, because the amount of space is settled so that the objects to be fixed would not contact each other and the adhesive material is filled between the space to fix, problems as listed below have taken place.

Figure 17A:
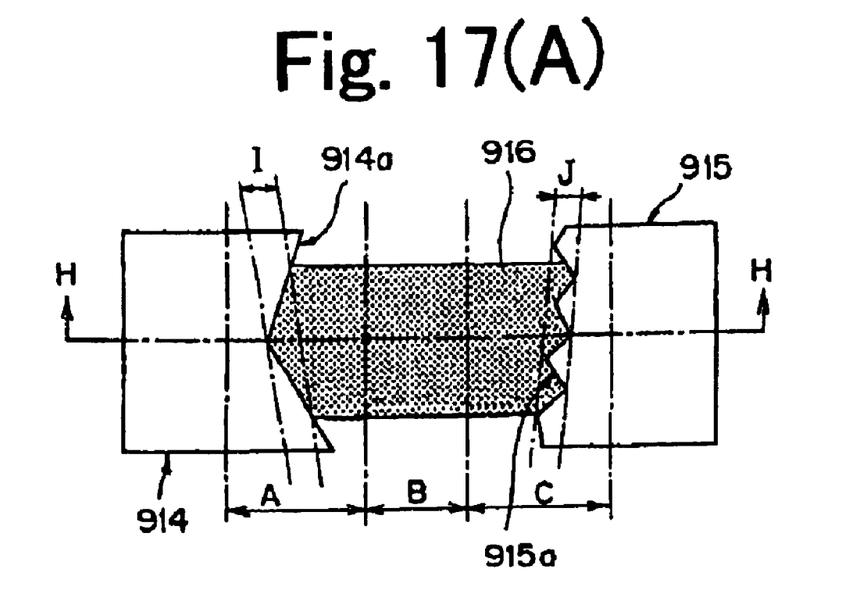
FIG. 17(A) is a plan view.
Figure 17B:
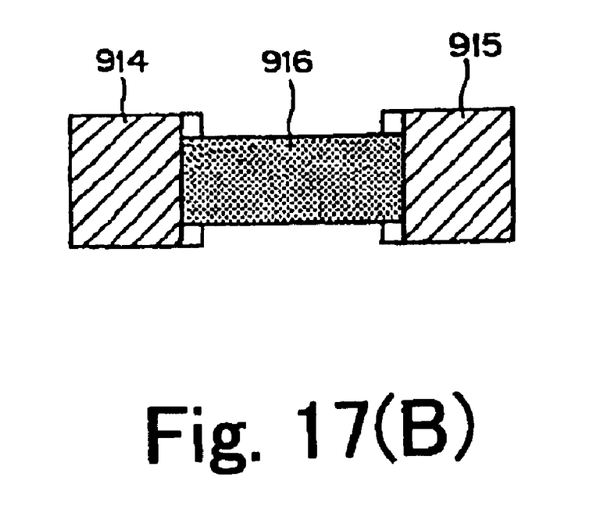
FIG. 17(B) is a cross sectional view cut along H—H line of FIG. 17(A).

Hereinafter, this caulking adhering method will be explained with reference to a drawing of one example as shown in FIG. 17, and the problems of it will be concretely explained.

In FIG. 17, the reference numeral 914 designates a work piece to be adhered, 915 designates a work piece holding member and 916 designates the adhesive material, the work piece 914 will be fixed onto the work piece holding member 915 in this example.

To adhere and fix the work piece 914 on the work piece holding member 915 without contacting each other, a space B is required in order to keep a space to be filled by the adhesive material 916 so that the adhering surface 914a of work piece 914 and the adhering surface 915a of work piece holding member 915 would not contact each other even when an amount of dispersion in positional discrepancy is A (spacing for positioning adjustment of work piece 914) at the adhering surface 914a of work piece 914, and an amount of dispersion in discrepancy C at the adhering surface 915a of work piece holding member 916, occur. In consequence of this the film thickness of adhesive material 916 varies from B at the minimum and to A+B+C at the maximum, then it becomes dispersing in a range A+C.

Further, it may also become dispersing in a range I+J because of influence of a surface accuracy in the adhering surface 914a of work piece 914 and the adhering surface 915a of work piece holding member 915.

Generally, as the adhesive material shrinks when it is hardened, it becomes important that the film thickness of adhesive material must be reduced as little as possible in order not for the objects to be fixed to have the positional discrepancy after the adhesive material has been hardened. On the contrary, as the film thickness of adhesive material can not be made less than B in the above described caulking adhering methods there was a case in that an improvement in the amount of positional discrepancy after fixing, could not be realized because changing of film thickness as a counter measure could not be applied even the positional discrepancy happened with amount much larger than the tolerable amount when the film thickness of adhesive material is B.

And because the dispersion of the film thickness happens within a range of A+C, the amount of shrinkage at the adhesive material after fixing, changes together in accordance with the dispersions In the consequence of this, the position of work piece 914 also disperses and there was a case in that the required accuracy could not be maintained. Commonly the volume shrinkage rate of ultraviolet setting adhesive material is in a range from 5 to 10 percent. Presuming a case that the volume shrinkage rate is 7%, it shrink about 2% in each respective three directions when the hardening shape of adhesive material is cubic.

In consequence of this, when the difference in a level of about 0.5 mm occurs in the film thickness of adhesive material, it causes that about 10 μm of differences in the shrinkage after hardened, occur in respective directions. In a case when the objects to be fixed are made by injection molding of resin, there can be a case in that above described dispersion of film thickness A+C becomes more than 0.5 μm, there is enough possibility that the positional discrepancy becomes a fatal problem.

As above described, because there may happen a case that the required accuracy of fixing position for ink jet work piece is not maintained by the prior caulking adhering method, a yield in production line is made to be decreased or there must be a disposal for scrapping the objects fixed, which is not good in accuracy of fixing, then they makes problem happened that costs for production are increased.

To solve this kind of problems, there is a technique disclosed in Japanese Patent Laid Open No. Hei 10-309801.

This fixing structure is arranged in that lying an intermediate holding member between a work piece and a work piece holding member and fixing the intermediate holding member onto the work piece by adhesive material and at the same time fixing the intermediate holding member onto the work piece holding member through the adhesive material. Because of this lying structure of the intermediate holding member between the work piece and the work piece holding member, by means of only controlling to make minimum for necessity and constant the film thickness of the adhesive materials those are used for a space between the adhering surfaces of the work piece and the intermediate holding member, and used for a space between the adhering surfaces of the work piece holding member and the intermediate holding member, this technology can achieve to attach the work piece onto the work piece holding member with high accuracy, and to keep high yield of production and at the same time to prevent occurrence of decrease in fixing force of the work piece after production without controlling the positional accuracy of adhering point of the work piece and the work holding member.

However, the above described technology has still problem to be improved when it is applied to a case that a solid state image data input unit is the work piece and a solid state image data input unit holding member is the work piece holding device and an intermediate holding member is lying through adhesive material between the solid state image data input unit and the work piece holding member, because it has not a concrete structure in order to enable the high accuracy attachment of the solid state image data input unit after the easy positional adjustment in five axes of the solid state image data input unit, in the positional adjustment of the solid state image data input unit before fixing by the adhesive material, a line image focused by an image focusing lens is positioned on the solid state image forming device and an optical characteristics of them are measured with a required predetermined accuracy, and to prevent an occurrence of decrease in fixing force of the solid state image data input unit after production.

In consequence of this, the present invention has an object to provide a fixing structure for the parts of optical element by which attaching of the parts of optical element is enabled to easily achieve a positional adjustment in the axis of the parts of optical element with high accuracy after positional adjustment has done in the axes before fixing of the parts of optical element by adhesive material, and an image data input unit and an image data input apparatus which are made with the fixing structure.

SUMMARY OF THE INVENTION

To achieve the above stated object, according to the first aspect of this invention, a fixing structure for parts of optical element comprising: parts of optical element having an edge surface which is a side surface surrounding a light beam passing surface; an intermediate holding member having a first attaching surface which is facing to said side surface and having a second attaching surface which is arranged in a different angle from said first attaching surface; and a base member having an attaching surface which is facing to said second attaching surface; characterized in that: the base member and said parts of optical element which has been adjusted the positional relation to the base member are adhered and fixed through said intermediate holding member, is provided.

Also to achieve the above stated object, according to the second aspect of this invention, a fixing structure for parts of optical element according to above first aspect characterized in that a photoelectric transforming member is fixed on said base member in a predetermined positional relation with said parts of optical element, is provided.

Further to achieve the above stated object, according to the third aspect of this invention, a fixing structure for parts of optical element according to the first aspect characterized in that the adhesive material used for said adhesion and fixing is light setting adhesive material, and said intermediate holding member is transparent for at least light which hardens said light setting adhesive material, is provided.

Still further to achieve the above stated object, according to the fourth aspect of this invention, a fixing structure for parts of optical element according to the first aspect, characterized in that said first attaching surface and said second attaching surface of said intermediate holding member are made to be perpendicular, is provided.

Yet further to achieve the above stated object, according to the fifth aspect of this invention, a fixing structure for parts of optical element according to the fourth aspect, characterized in that said intermediate holding member bas rib.

Yet further to achieve the above stated object, according to the sixth aspect of this invention, a fixing structure for parts of optical element according to the first or fourth aspect, characterized in that said parts of optical element has a flat portion which faces to the first attaching surface of said intermediate holding member on a side surface of said parts of optical element, is provided.

Yet further to achieve the above stated object, according to the seventh aspect of this invention, a fixing structure for parts of optical element according to the sixth aspect, characterized in that said flat portion is parallel to an optical axis of said parts of optical element, is provided.

Yet further to achieve the above stated object, according to the eighth aspect of this invention, a fixing structure for parts of optical element according to the sixth aspect, characterized in that said flat portion is formed by grinding of side surface of said parts of optical element, is provided.

Yet further to achieve the above stated object, according to the ninth aspect of this invention, a fixing structure for parts of optical element according to the first aspect, characterized in that the fixing structure further comprising a spacing member having a side contacting surface which is aligned with side surface of said parts of optical element, and having aligning surface which is aligned with said first attaching surface of the intermediate holding member, characterized in that said side contacting surface of the spacing member faces to the side surface of said parts of optical element, and and aligning surface of said spacing member faces to the first contacting surface of said parts of optical element, is provided.

Yet further to achieve the above stated object, according to the tenth aspect of this invention, a fixing structure for parts of optical element according to the sixth aspect, characterized in that a photoelectric transforming member is fixed on said base member in a predetermined positional relation with said parts of optical element, the first attaching surfaces are arranged in both sides of a best effective region of said parts of optical element for said transforming member is provided.

Yet further to achieve the above stated object, according to the eleventh aspect of this invention, an image data input unit in which solid state image forming device is disposed at a position where an image is focused by an image focusing lens, comprising: lens having an edge surface which is a side surface surrounding a light beam passing surface; an intermediate holding member having a first attaching surface which is facing to said side surface and having a second attaching surface which is arranged in a different angle from said first attaching surface; and a base member having an attaching surface which is facing to said second attaching surface; characterized in that: the base member and the lens which has been adjusted the positional relation to the base member are adhered and fixed through said intermediate holding member, is provided.

Yet further to achieve the above stated object, according to the twelfth aspect of this invention, an image data input unit according to the eleventh aspect, characterized in that said unit further comprising a cover between said image focusing lens and said solid state image forming device, is provided.

Yet further to achieve the above stated object, according to the thirteenth aspect of this invention, an image data input unit according to the eleventh aspect, characterized in that said image focusing lens is composed of plurality of lenses, is provided.

Yet further to achieve the above stated object, according to the fourteenth aspect of this invention, an image data input apparatus utilizing said image data input unit according to any one of the eleventh to thirteenth aspect, is provided.

Hereinafter an embodiment of the present invention will be described with reference to the drawings.

BRIEF DESCRIPTION OF THE DRAWINGS

FIG. 2a are perspective views to show an important part of the fixing structure shown in FIG. 1.

FIG. 4a are perspective views to show a variation of example of the structure shown in FIG. 1.

FIG. 9a are perspective views to show one example of assembling of the image data input unit according to the present invention, FIG. 10a are perspective views to show another example of assembling of the image data input unit according to the present invention.

FIG. 17 are model drawings of the caulking adhering method in prior art.

DETAILED DESCRIPTION OF THE PREFERRED EMBODIMENTS

Hereinafter the preferred embodiments of the present invention will be described it detail with reference to the drawings.

Figure 1:
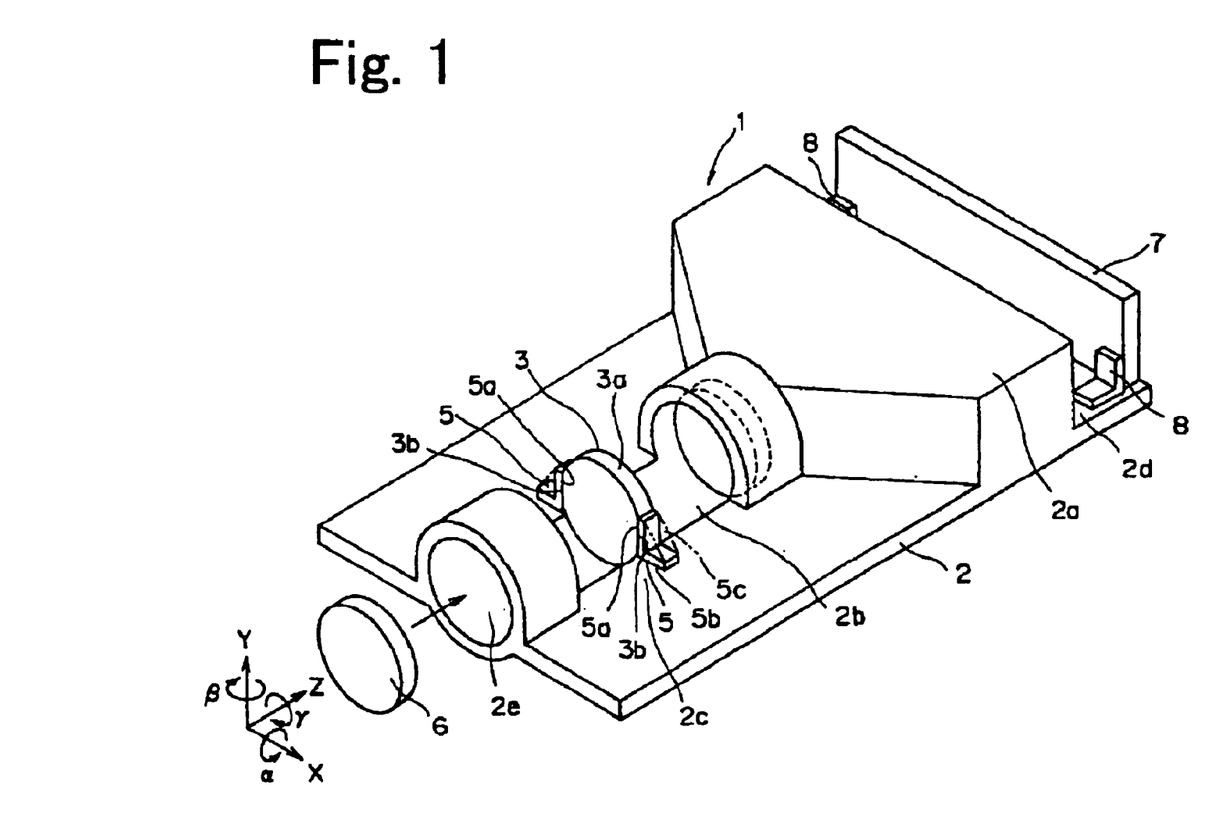
FIG. 1 is a perspective view to show an image data input unit including a fixing structure according to the present invention.

FIG. 1 is a perspective view to show an image data input unit including a fixing structure according to the present invention.

As shown in FIG. 1, an image data input unit 1 comprises a lens 3 as part of an optical element, an intermediate holding member 5 and a housing 2, as a base member, where the lens 3 has an edge surface 3a which is one side surrounding a light path where a light beam as image data information from a document surface passes, and the intermediate holding member 5 has a first attaching surface 5a which faces to the edge surface 3a, and a second attaching surface 5b which is arranged to have a different angle, in this embodiment 90 degrees, from the first attaching surface 5a to connect the lens 3 and the housing 2, and the housing 2 has an attaching surface 2c which faces to the second attaching surface 5b.

In this image input unit 1, the housing 2 and lens 3 which has been adjusted the positional relation to the housing 2, are fixed by adhesive material through the intermediate holding member 5.

Figure 2A:
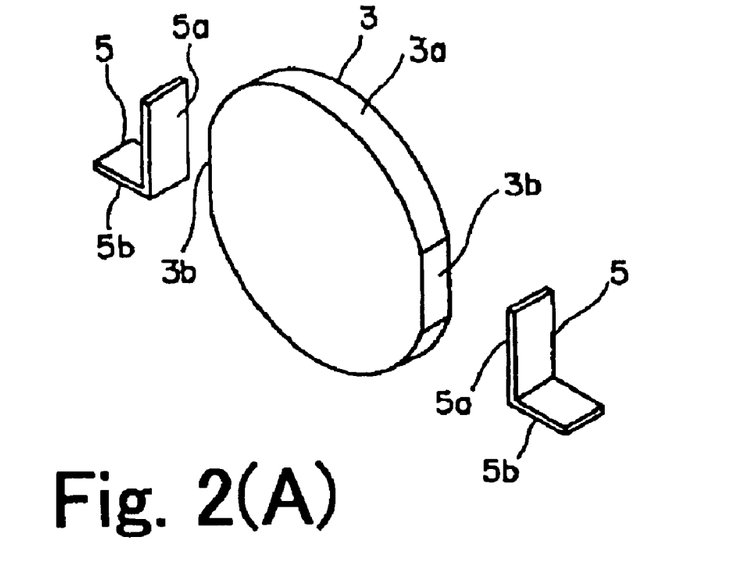
Figure 2B:
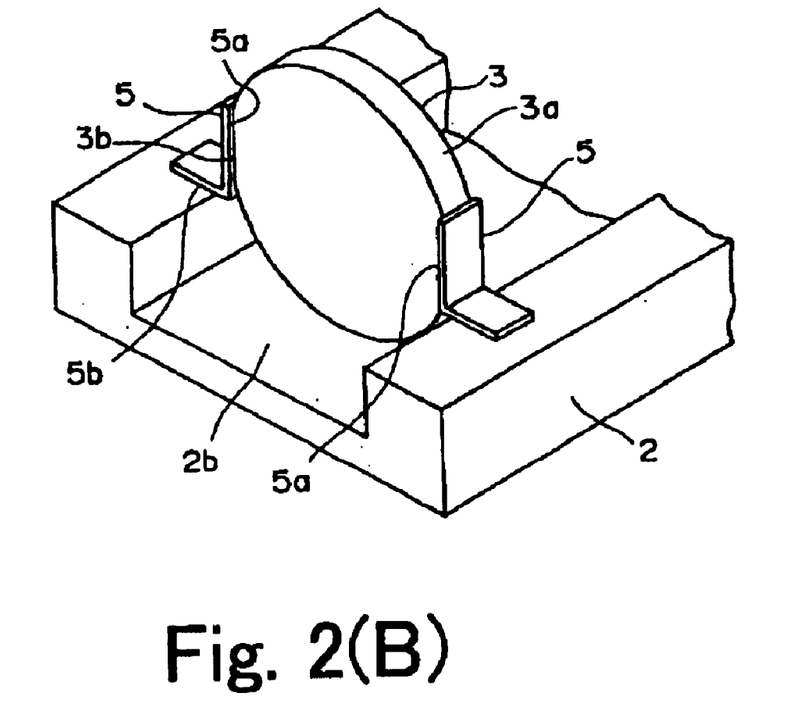

The aforesaid lens 3 has a flat surface 3b which is arranged on the edge surface 3a with the same diameter as shown in FIG. 2. This flat surface 3b is made by a cutting process or grinding process and it may be polished when needed. By this arrangement of the flat surface 3b made as above described, an adhering area with the first attaching surface 5a of the intermediate holding member 5 can be made larger and it can make the fixing force stronger.

The aforesaid housing 2 fixes the lens 3 and a solid state image data input unit 7 in a predetermined positional relation after adjustment. This housing 2 has a ditch with circular cross section 2b, a flat attaching surface 2c which is adjacent to the ditch with circular cross section 2b, an attaching surface 2d to attach the solid state image data input unit 7 and a cover 2a for shielding light between the image focusing lens which is composed of lens 3, 6 and so on, and the solid state image data input unit 7. Due to the arrangement of this cover 2a for shielding light, an influence by the disturbing light from outside can be taken away and better image can be obtained. This housing 2 is fixed on the predetermined position of the image data input apparatus by means of the screws, caulking, adhesion, welding and so on. Herein, though the shape of ditch which is formed on the housing 2 in this embodiment is circular, any type of shape can be applicable for the ditch because a possibility is high that the lens 3 to be fixed becomes floating from the ditch after the positional adjustment.

As the material to be used for the intermediate holding material 5, any material with high transparency for light, for example such as ARTON (Trade name by JSR Corp.), Zeonex (Trade name by Zeon Corp.), or polycarbonate can be utilized.

Both adhering surfaces of the intermediate holding member 5 move slidably to follow movement of the lens 3 by the surface tension of the adhesive material when a position of the lens is moved by the positional adjustment.

By a selection of the first adhering surface 5a and the second adhering surface 5b that both adhering surfaces are made to be perpendicular, because the positional adjustment for the lens 3 around the six axes can be realized, it is adjusted independently in each axis respectively.

As shown in FIG. 2, an influence of shrinkage happened when the adhesive material is hardened, can be reduced by an arrangement in which two intermediate holding members 5 are utilized to face to the flat portions 3b on the edge 3a of the lens 3 as adhering surface of the optical element side.

As shown in FIG. 1, a mechanical strength of the intermediate holding member 5 can be increased without increasing a loss of light when the ultraviolet setting adhesive material is hardened by an arrangement in which light transparent ribs 5c are made between the adhering surfaces of the intermediate holding member 5.

Because the first fixing surface 5a which is the fixing surface at the lens side of said intermediate holding member 5, and the second fixing surface 5b which is the fixing surface at the holding member side, are made to be perpendicular each other, the positional adjustment can be achieved in any movement which is made around directions of X, Y, Z, α, β and γ.

Supposing a case when the intermediate holding member 5 is connected with the lens 3 and the housing 2 by the adhesive material which is hardened with ultraviolet, as for the positional adjustment in X and Z direction, the lens 3 and the intermediate holding member 5 are relatively moved with a sliding movement on an attaching surface 2c of the housing which is the fixing surface at the holding member side of the housing 2, in order to be adjusted.

As for the positional adjustment in Y direction, the lens 3 is relatively moved with a sliding movement on the first attaching surface 5a of the intermediate holding member 5 which is the fixing surface at lens side of the intermediate holding member 5, in order to be adjusted.

Figure 3A:
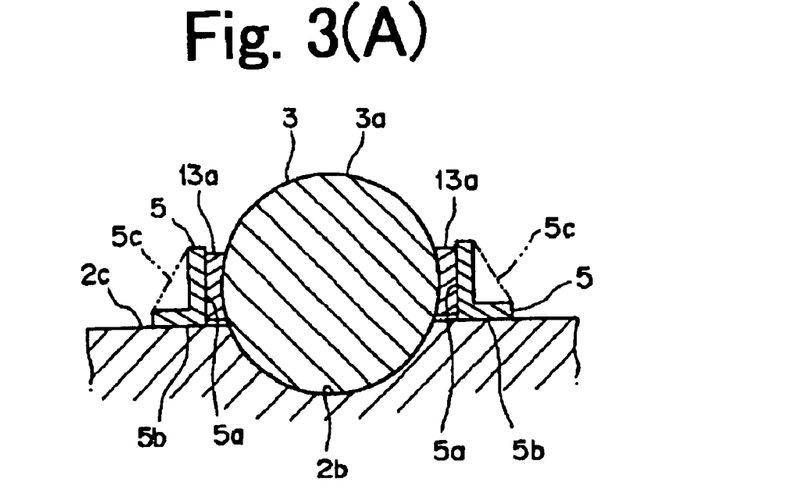
FIG. 3(A) is a side view to show a spacing member to be utilized instead of a flat surface for fixing structure shown in FIG. 2.
Figure 3B:
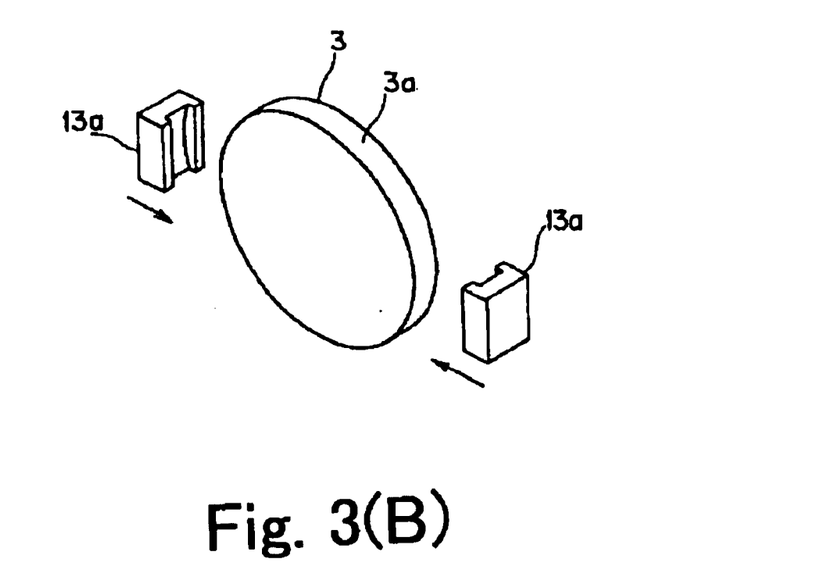
FIG. 3(B) is a perspective view to show a status of using the spacing member.

FIG. 3(A) is a side view to show a spacing member to be utilized instead of the flat surface for fixing structure shown in FIG. 2, and FIG. 3(B) is a perspective view to show a status of using the spacing member.

As shown in FIG. 3, this embodiment has an arrangement that a spacing member 13a with U shaped cross section is attached to the edge surface 3a instead of forming the flat surface 3b on the edge surface 3a of the image focusing lens 3. Almost the same merit can be attained instead of forming the flat surface 3b on the edge surface 3a of the image focusing lens 3, by this arrangement of spacing member 13.

Figure 4A:
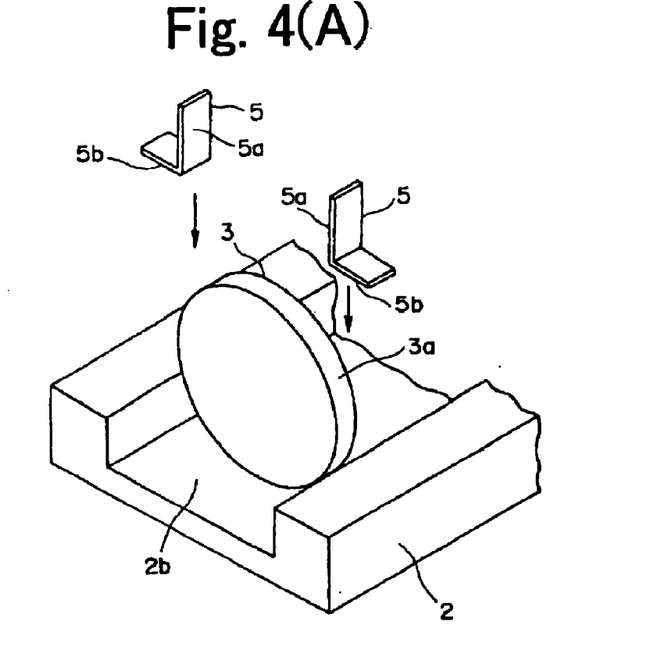

FIG. 4a are perspective views to show a variation of example of the fixing structure shown in FIG. 1.

Figure 4B:
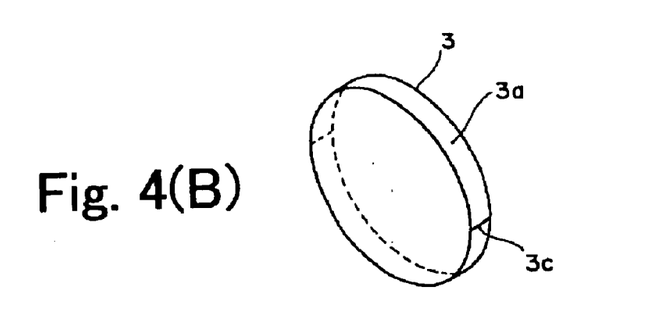

As shown in FIG. 4(A), it may be applicable to adhere the lens 3 and the intermediate holding member 5 in line contact as shown in FIG. 4(B) without forming the flat surface 3b on edge surface 3a of the image focusing lens 3. In this embodiment the fixing strength is decreased in comparison with a case of forming the flat surface, but it can be made without process for flat surface work or the spacing member.

Figure 5:
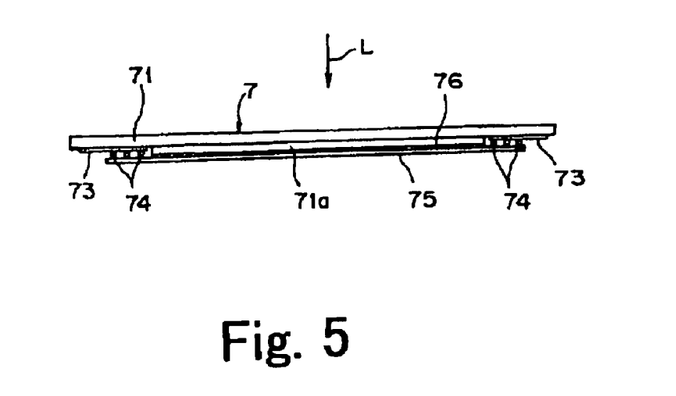
FIG. 5 is a plan view of a solid state image forming device to be utilized in the image data input unit shown in FIG. 1.
Figure 6:
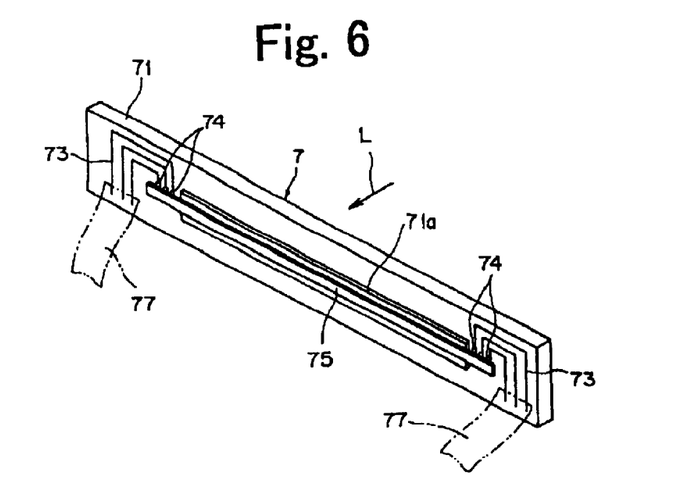
FIG. 6 is a perspective view of a solid state image forming device to be utilized in the image data input unit shown in FIG. 1.

FIG. 5 is a plan view of a solid state image forming device and FIG. 6 is a perspective view of a solid state image forming device.

As shown in FIG. 5, 6, the solid state image data input unit 7 comprises a glass substrate 71 on which a wiring pattern 73 is made, and solid state image forming device 75 which is connected to the glass substrate through a bump 74. The glass substrate 71 has a projecting portion 71a on a position corresponding to the pixel region of the solid state image forming device 75, this projecting portion 71a and the solid state image forming device 75 are adhered through adhesive material which is made in a form of thin film. By electrical connection between the wiring pattern 73 and PPC (flexible printed circuit board) 77, an electric signal which is converted from an incident light beam, can be output. Herein, a well known generic CCD which is made of a combination of ceramic compound and a substrate, can be utilized, too.

Figure 7:
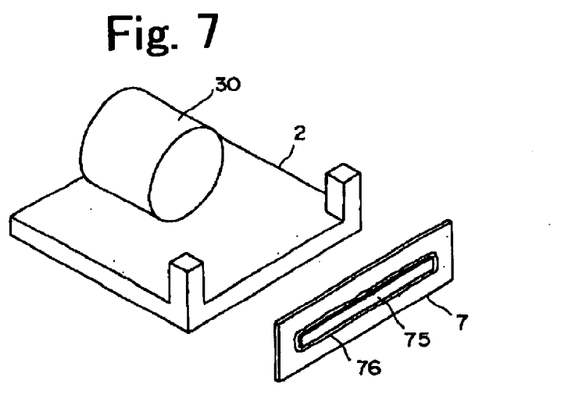
FIG. 7 is a perspective view to show a status of attaching the solid state image forming device onto a housing of the image data input unit according to the present invention.

FIG. 7 is a perspective view to show a status of attaching the solid state image forming device onto a housing of the image data input unit.

As shown in FIG. 7, the solid state image data input unit 7 is fixed to the attaching portion of the housing 2 after the positional adjustment. In this embodiment the positional adjustment between the solid state image data input unit 7 and the image focusing lens 30 (adjusting lens 3 and fixed lens 6) is achieved by the adjustment in the side of image focusing lens 30.

Figure 8:
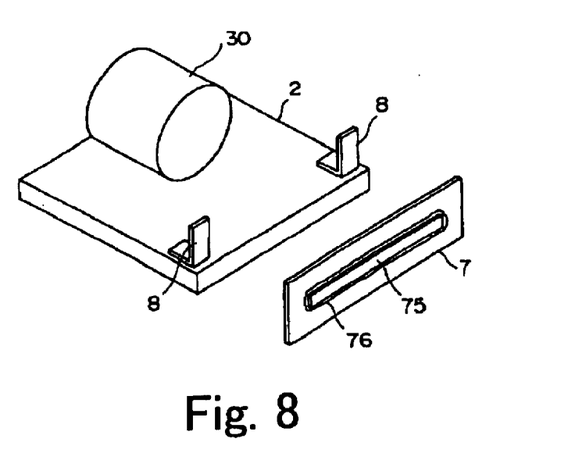
FIG. 8 is a perspective view to show another example of status of attaching the solid state image forming device onto a housing of the image data input unit according to the present invention.

FIG. 8 is a perspective view to show another example of status of attaching the solid state image forming device onto a housing of the image data input unit.

As shown in FIG. 8 the solid state image data input unit 7 can be attached freely adjustable onto the attaching surface of the housing 2 through an intermediate holding member 8 with L shaped. In this embodiment the positional adjustment of the solid state image data input unit 7 for the housing 2 also can be achieved.

Figure 9A:
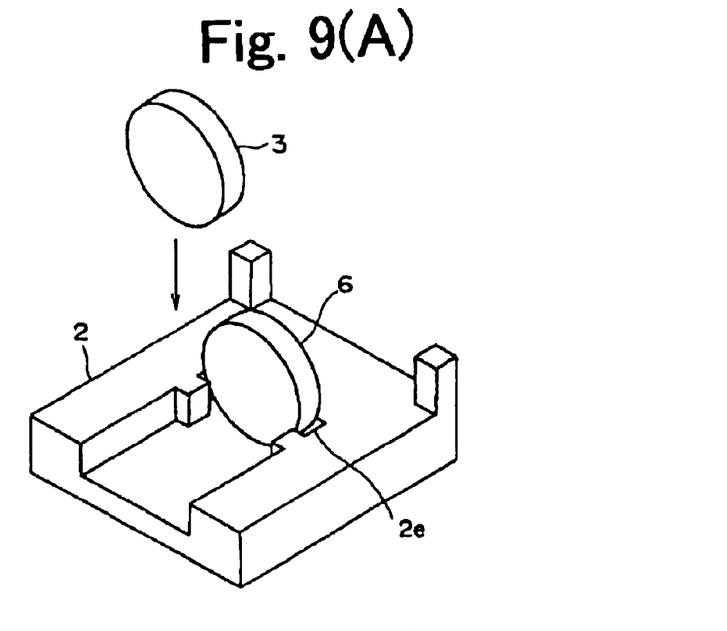
Figure 11:
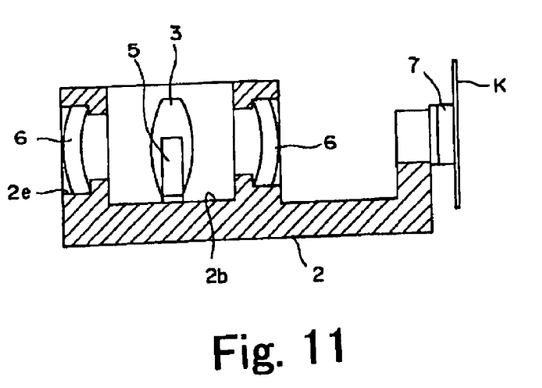
FIG. 11 is a cross sectional view of assembled image data input unit according to the present invention.

FIG. 9a are perspective views to show one example of assembling of the image data input unit, and FIG. 11 is a cross sectional view of assembled image data input unit.

Figure 9B:
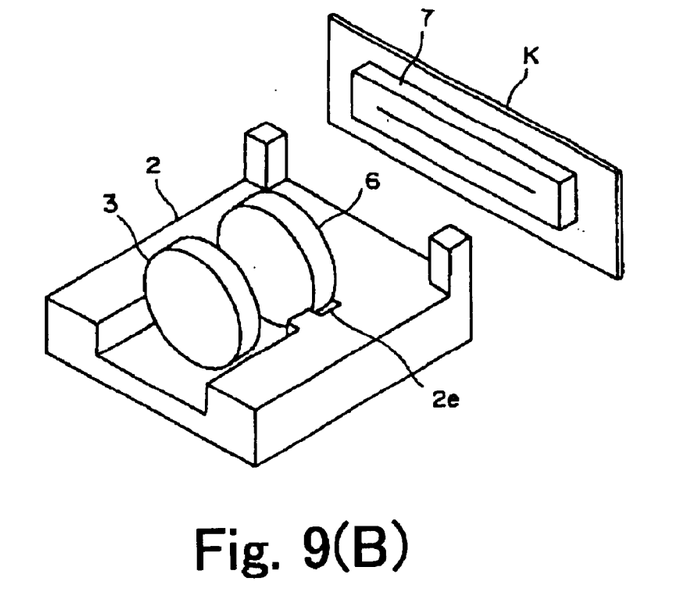

An shown in FIG. 9(A) in a fixing structure for image data input unit comprising, an image focusing optical system having plurality of lenses 3, 6, a solid state image data input unit 7 having solid state image forming device fixed onto a position where the image of the image focusing optical system is focused, and a housing 2 as a holding member of these, the plurality of lenses 3, 6 are classified into an adjustable lens 3 which is fixed after the positional adjustment and the fixed lens 6 which is fixed without the positional adjustment, the fixed lens 6 is fixed onto a fixed lens attaching portion 2e formed on the housing 2, then the adjustable lens 3 is fixed according to the optical axis of fixed lens 6, then the solid state image data input unit 7 is fixed in accordance with the optical axis of the assembled optical system as shown in FIG. 9(B), the image data input unit is assembled as shown in FIG. 11. Herein, the reference index K designates a substrate on which the IC is implemented.

Figure 10A:
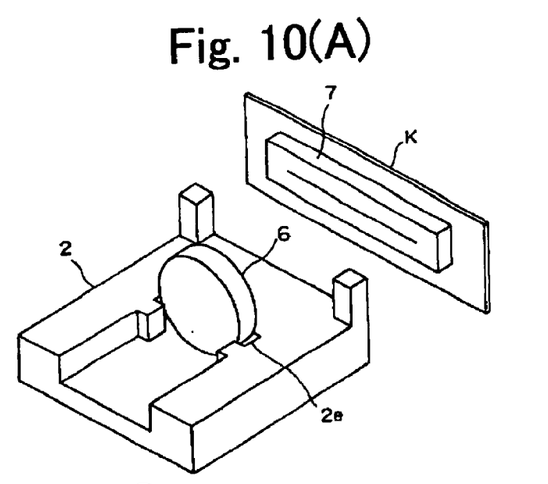

FIG. 10a are perspective views to show another example of assembling of the image data input unit.

Figure 10B:
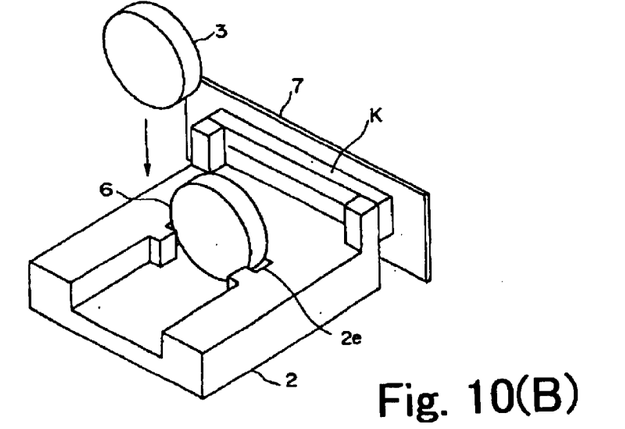

As shown in FIG. 10(A) in a fixing structure for image data input unit comprising, an image focusing optical system having plurality of lenses 3, 6, a solid state image data input unit 7 having solid state image forming device fixed onto a position where the image of the image focusing optical system is focused, and a housing 2 as a holding member of these, the plurality of lenses 3, 6 are classified into an adjustable lens 3 which is fixed after the positional adjustment and the fixed lens 6 which is fixed without the positional adjustment, the fixed lens 6 is fixed onto a fixed lens attaching portion 2e formed on the holding member, then the solid state image data input unit 7 is fixed according to the optical axis of fixed lens 6, then the adjustable lens 3 is fixed in accordance with the optical axis of the fixed lens 6 or generic optical axis of combination of the fixed lens 6 and the solid state image data input unit 7 as shown in FIG. 10(B).

Figure 12:
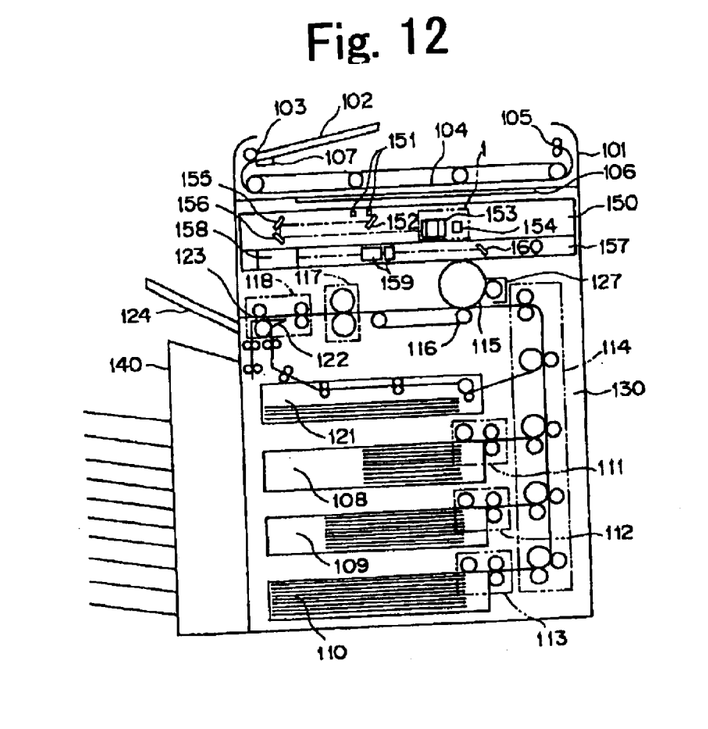
FIG. 12 is a rough sketch to show a copying machine as one example of image data input apparatus according to the present invention.

FIG. 12 is a rough sketch to show a multifunction digital copying machine as one example of image data input apparatus.

As shown in FIG. 12, this image data input apparatus is composed of comprising automatic document supplier 101, image data input unit 150, image data writing unit 157, paper supplying unit 130 and post-processing unit 140. The automatic document supplier 101 supplies automatically a document onto a contacting glass 106 of the image data input unit 150, and discharges automatically the document which has been read over. The image data input unit 150 illuminates the document set on the contacting glass 106 and read the optical information by CCD 154 which is photoelectric transforming device, the image data writing unit 157 forms an image data on a photosensitizer 115 corresponding to the image data signal which is input from the document read, and transfers it and fixes onto a paper supplied by the paper supplying unit 130. The transferred paper which has been completed all the process is discharged to the post-processing unit 140, and required post-process is achieved such as sorting or stapling.

The image data input unit 150 comprises the contacting glass 106 and the optical scanning system, which includes an exposing lamp 151, a first mirror 162, lens 153, CCD image sensing device 154, a second mirror 155 and a third mirror 156, The exposing lamp 151 and the first mirror 152 are fixed on a first carriage which is not shown in the drawing, the second mirror 155 and the third mirror 156 are fixed on a second carriage which is also not shown in the drawing. The first and second carriages are moved mechanically to scan with relative velocity in a ratio of two to one (2:1) in order not to change a length of the light path. The optical scanning system is driven by a scanner driving motor which is not shown in the drawing.

The image data on the document to he copied is read by the CCD image sensing device 154, and optical signal of the image data are transformed into electrical signal in order to be processed. When the tens 153 and the CCD solid state image forming device are moved in the left and right direction of the drawing, the magnification rate of the image can be altered.

That is to say, the position of the lens 153 and the CCD solid state image forming device in the left and right direction is set in accordance with the predetermined magnification rate.

The writing unit 157 is composed of laser output unit 158, image focusing lens 159 and a mirror 160, a set of laser diodes which are light sources of laser, and polygon mirror which is driven to rote in high and constant velocity by a motor, are set up in the laser output unit 158.

The laser light beam irradiated from the laser output unit 158 is reflected and changed its direction by the above described polygon mirror which is rotated in constant velocity, passes through the image focusing lens 159, and it is reflected by the mirror 160 to be focused on surface of the photosensitizer. The reflected laser light beam is scanned for exposure in, what is called, main scanning direction which is perpendicular to a rotating direction of the photosensitizer 116, the image data signal are output in an unit of every line from a MSU 606 of the image processing unit. By a repetition of the main scanning in a predetermined period which corresponds to a recording density and rotating velocity of the photosensitizer 115, an image is formed on the photosensitizer as an electrostatic latent image.

As above described, the laser light beam output from the writing unit 157 is irradiated onto the photosensitizer 115 of an image forming system, a beam sensor which generates a synchronizing signal and is not shown in the drawing, is disposed at irradiated area by one side of the photosensitizer 115. The signal which is output from this beam sensor is a main scanning synchronizing signal and controlling of recording timing for image data and generation of controlling signal for input/output of the image data signal are achieved based on this main scanning synchronizing signal.

Figure 13:
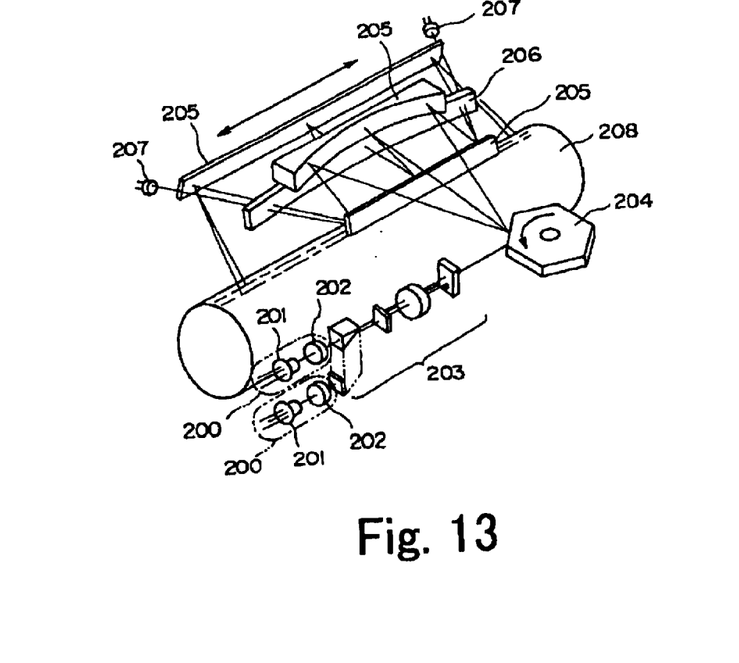
FIG. 13 is a perspective view to show an image data input unit according to the present invention.

FIG. 13 is a perspective view to show an image data input unit utilizing a fixing structure according to the present invention.

As shown in FIG. 13, the image data input unit comprises LD 201, collimating lens 202, optical system to compose a light path 203, polygon mirror 204, reflection mirror 205, fθ lens 206 and synchronizing sensor 207 to make an electrostatic latent image on a photosensitizing drum 208. The fixing structure of the present invention can be applicable to this kind of image data input unit utilizing a fixing structure 200 comprising LD 201 and collimating lens 202.

As described above, by utilizing of the fixing structure according to the present invention, an advantage is attained that an attaching of optical element with high accuracy can be achieved after positional adjustment around axes because the positional adjustment around axed is easily achieved before fixing by adhering of parts of optical element.

Also, by utilizing the image data input unit according to the present invention, the positional adjustment of the solid state image forming device is made easily achieved with screws or fixed without adjustment because the discrepancy can be adjusted solely in the image focusing lens side, and image data input with high accuracy can be achieved because the parts of optical element are assembled with high accuracy.

Further by utilizing the image data input apparatus, image scanning with high accuracy can be achieved because data input with high accuracy is attained.

The present invention should not be understood that it is limited only to the above described example of embodiment. It can be brought to an implementation in various different manners without departing from spirit of the invention.

What is claimed is:

1. A structure for fixing an optical element comprising:
    a base member having an attaching surface;
    an optical element which is mounted on said base member and has side surfaces around a surface through which light passes;
    intermediate holding members for fixing said optical element to said base member, each of said intermediate holding member including a first attaching surface which contacts with each of said side surfaces of said optical element and a second attaching surface mounted on said attaching surface of said base member and extending from said first attaching surface in a different angle; and
    contact mechanisms respectively provided between the first attaching surfaces of the intermediate holding members and the side surfaces of the optical element for firmly maintaining the contact of the first attaching surfaces and the side surfaces,
    wherein said first attaching surfaces of the intermediate holding members and said side surfaces of said optical element, and said second attaching surface of maid intermediate holding members and said attaching surface of said base member are fixed through the contact mechanisms by an adhesive agent.

2. The structure according to claim 1, further comprising a photoelectric transforming member fixed on said base member in a predetermined position with respect to said optical element.

3. The structure according to claim 1, wherein said adhesive agent is a light hardening adhesive agent and said intermediate holding members are transparent for at least light which hardens said light hardening adhesive agent.

4. The structure according to claim 1, wherein said first and second attaching surfaces of said intermediate holding members are perpendicular with respect to each other.

5. The structure according to claim 4, wherein said intermediate holding members have ribs disposed between surface of the intermediate holding members that are opposite to the first and second attaching surfaces of the intermediate holding members.

6. The structure according to claim 1, wherein said contact mechanisms comprise opposite side surface flat portions of the optical element, each of which faces to each of the first attaching surfaces of said intermediate holding member.

7. The structure according to claim 6, wherein each of said flat portions is parallel to an optical element.

8. The structure according to claim 6, wherein said flat portions are formed by grinding the opposite side surfaces of said optical element.

9. The structure according to claim 1, wherein the contact mechanisms comprise spacing members each having a side contacting surface which is aligned with each of the side surfaces of said optical element, and having an aligning surface which is aligned with mach of the first attaching surfaces of the intermediate holding members, said side contacting surface of each of the spacing members facing to the side surface of each of said side surfaces of said optical element, and said aligning surface of each of said spacing members facing to each of the first attaching surfaces of said intermediate holding member.

10. The structure according to claim 6, further comprising a photoelectric transforming member fixed on said base member in a predetermined position with respect to said optical element,
    wherein the first attaching surfaces are arranged in both side, of a best effective region of said optical element for said transforming member.

11. A unit for inputting image data in which a solid state image forming device is disposed at a position where an image is focused by an image focusing lens comprising:
    a base member having an attaching surface;
    a lens which is mounted on said base member and has side surfaces around a surface through which light passes;
    intermediate holding members for fixing said optical element to said base member, each of said intermediate holding members including a first attaching surface which contacts with each of said side surfaces of said optical clement and a second attaching surface mounted on said attaching surface of said base member and extending from said first attaching surface in a different angle; and
    contact mechanisms respectively provided between the first attaching surface of the intermediate holding members and the side surface of the optical element for firmly maintaining the contact of the first attaching surfaces and the side surfaces,
    wherein said first attaching surfaces of the intermediate holding members and said side surfaces of said optical element, and said second attaching surfaces of said intermediate holding members and said attaching surface of said base member are fixed through said contact mechanisms by an adhesive agent.

12. The unit according to claim 11, further comprising a cover between said image focusing lens and said solid state image forming device.

13. The unit according to claim 11, wherein said image focusing lens is composed of a plurality of lenses.

14. An image data input apparatus utilizing said image data input unit according to claim 1.

15. An image data input apparatus utilizing said image data input unit according to claim 11.

16. An image data input apparatus utilizing said image data input unit according claim 12.

17. The structure according to claim 11, wherein said contact mechanisms comprise opposite side surface flat portions of tho optical element, each of which faces to each of the first attaching surfaces of said intermediate holding members.

18. The structure according to claim 11, wherein the contact mechanisms comprise spacing members each having a side contacting surface which as aligned with each of the side surfaces of said optical element, and having an aligning surface which is aligned with each of the first attaching surfaces of the intermediate holding members, said side contacting surface of each of the spacing member, facing to the side surface of each of said side surfaces of said optical element, and said aligning surface each of said spacing members facing to each of the first attaching surfaces of said intermediate holding members.

* * * * *